US006932447B2

(12) United States Patent
Chen et al.

(10) Patent No.: US 6,932,447 B2
(45) Date of Patent: Aug. 23, 2005

(54) COMPUTER ENCLOSURE WITH LOCKING BAR

(75) Inventors: Yun-Lung Chen, Tu-Chen (TW); Jung-Chi Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 249 days.

(21) Appl. No.: 10/016,413

(22) Filed: Dec. 10, 2001

(65) Prior Publication Data

US 2003/0107304 A1 Jun. 12, 2003

(51) Int. Cl.[7] .................................................. H05K 5/00
(52) U.S. Cl. ............................... 312/223.2; 312/265.5; 312/263
(58) Field of Search .......................... 312/223.2, 223.1, 312/265.5, 263, 265.6, 257.1; 361/724, 683; 292/302, 175, 116, 300; 220/650, 324, 326

(56) References Cited

U.S. PATENT DOCUMENTS

| | | | | |
|---|---|---|---|---|
| 5,593,219 A | * | 1/1997 | Ho | .............................. 361/683 |
| 5,825,626 A | * | 10/1998 | Hulick et al. | ................ 361/683 |
| 5,947,570 A | * | 9/1999 | Anderson et al. | ......... 312/223.2 |
| 5,992,955 A | * | 11/1999 | Yang | ........................ 312/265.6 |
| 5,997,115 A | * | 12/1999 | Radloff et al. | ........... 312/223.2 |
| 6,053,586 A | * | 4/2000 | Cook et al. | ............... 312/223.2 |
| 6,095,574 A | * | 8/2000 | Dean | .......................... 292/164 |
| 6,157,532 A | * | 12/2000 | Cook et al. | ................. 361/681 |
| 6,257,682 B1 | * | 7/2001 | Liu et al. | .................. 312/223.2 |
| 6,375,287 B1 | * | 4/2002 | Lai | .......................... 312/223.2 |
| 6,392,874 B1 | * | 5/2002 | Gan | ............................ 361/683 |
| 2003/0081399 A1 | * | 5/2003 | Davis et al. | ................. 361/818 |

FOREIGN PATENT DOCUMENTS

| | | | | |
|---|---|---|---|---|
| GB | 2255674 | * | 11/1992 | ................. 361/683 |
| JP | 403224296 | * | 10/1991 | ................. 361/683 |

* cited by examiner

Primary Examiner—Lanna Mai
Assistant Examiner—Hanh V. Tran
(74) Attorney, Agent, or Firm—Wei Te Chung (57) ABSTRACT

A computer enclosure includes a base (10), a side panel (80), a top panel (90), and a locking bar (50). The locking bar independently and readily secures the side and top panels to the enclosure. Either of the side and top panels can be detached from the enclosure independently, without affecting the attachment of the other to the enclosure. The enclosure is also easily protected from being opened by unauthorized persons.

20 Claims, 6 Drawing Sheets

COMPUTER ENCLOSURE WITH LOCKING BAR

BACKGROUND OF THE INVENTION

1. Field of the Invention

The present invention relates to computer enclosures, and more particularly to enclosures which have a side panel and a top panel that can be independently and readily secured to the enclosure by a locking bar.

2. Description of Related Art

A typical contemporary personal computer enclosure accommodates a number of electronic devices therein. The enclosure needs to be opened on a number of occasions for a variety of reasons, such as for replacing a defective electronic device with a new one. Therefore, the enclosure should be able to be readily opened and subsequently reassembled.

A conventional computer enclosure comprises a base, side panels, and a top panel. The side panels and the top panel are respectively secured to the base of the enclosure with separate securing elements. A plurality of locking slots is defined in the base. A plurality of locking tabs is formed on the side panels and the top panel, for engagement into the locking slots of the base. Screws are then used to secure the side panels and the top panel to the base.

A tool is required for installation and removal of the screws. This is unduly inconvenient and time-consuming. Examples of the above-mentioned mechanisms are disclosed in Taiwan Patent Applications Nos. 85211135 and 86213035, and U.S. Pat. No. 5,600,540.

An improved computer enclosure is desired to overcome the above-described disadvantages of the related art.

SUMMARY OF THE INVENTION

Accordingly, an object of the present invention is to provide a computer enclosure which has a locking bar for readily securing a side panel and a top panel to the enclosure such that the side and top panels can be independently detached from the enclosure.

Another object of the present invention is to provide a computer enclosure which can be protected from being opened by unauthorized persons.

In order to achieve the objects set out above, a computer enclosure of the present invention comprises a base, a side panel, a top panel and a locking bar. The base of the enclosure comprises a rear plate forming a horizontal flange at a top edge thereof and a bent flange at a side edge thereof. A plurality of fixing tabs is formed on the bent flange and on the rear plate near the bent flange. The fixing tabs define a receiving space therebetween. An opening and a plurality of first locking slots are defined in the rear plate at the receiving space. An exposed portion of the rear plate is located above the receiving space. The locking bar is received into the receiving space, and can vertically move therewithin. A plurality of second locking slots is defined in the locking bar, corresponding to the first locking slots of the rear plate. An arm portion is formed at a top of the locking bar. A central blocking section projects upwardly from the arm portion. An operating tab extends from the locking bar and is received in the opening of the rear plate. The side panel forms a plurality of bent tabs received in the first and second locking slots. A catch is formed on the top panel, corresponding to the exposed portion of the rear plate. The blocking section of the locking bar blocks the catch. An operating block is engaged with the operating tab for facilitating operation of the locking bar. The locking bar and the operating block can be locked to a locking tab bent rearwardly from the rear panel, to protect the enclosure from being opened by unauthorized persons.

Other objects, advantages and novel features of the present invention will become more apparent from the following detailed description when taken in conjunction with the accompanying drawings.

DETAILED DESCRIPTION OF THE INVENTION

Reference will now be made to the drawing figures to describe the present invention in detail.

Figure 1:
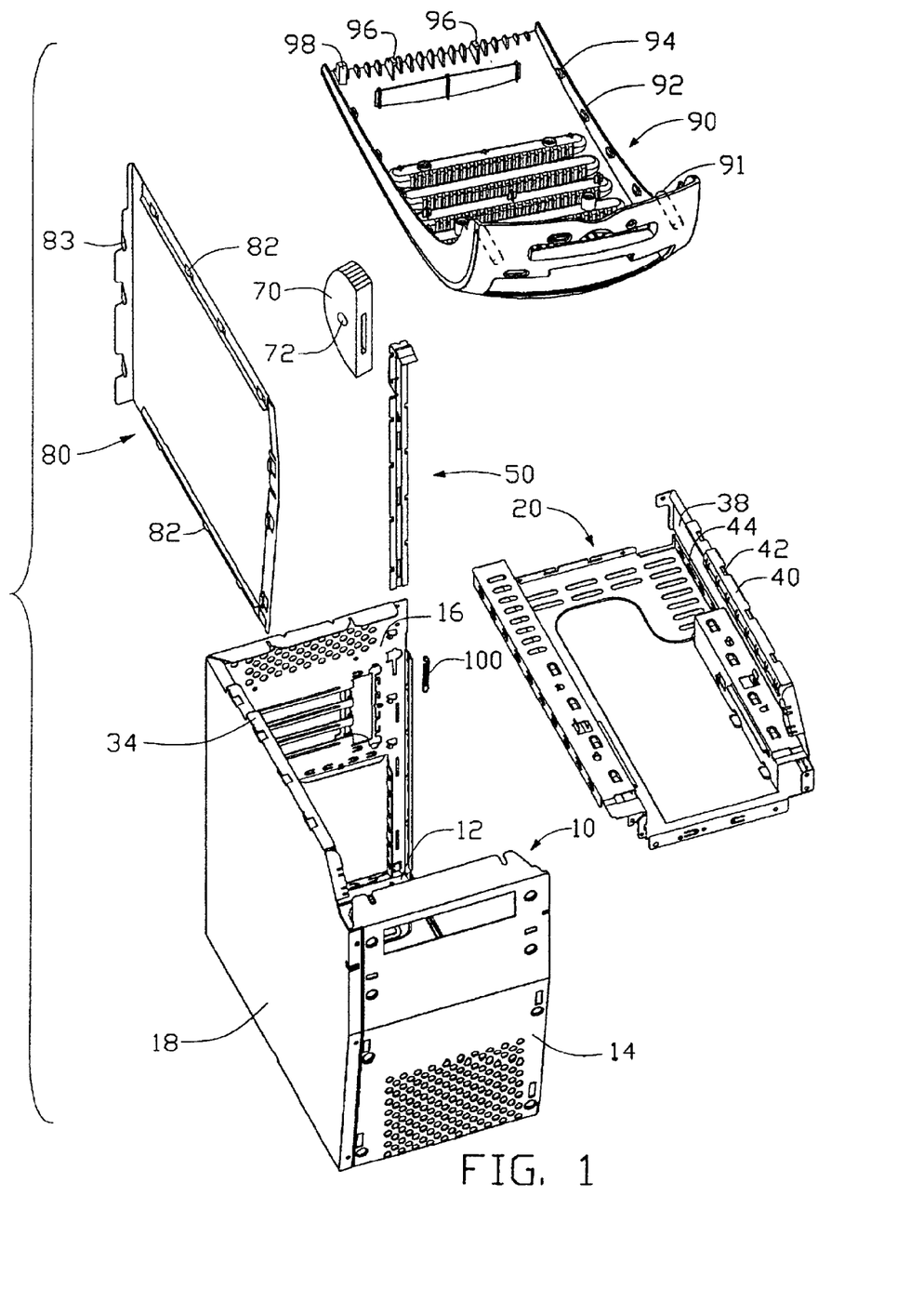
FIG. 1 is an exploded view of a computer enclosure in accordance with the present invention.

Referring to FIG. 1, a computer enclosure of the present invention comprises a base 10, a disk drive bracket 20, a locking bar 50, a side panel 80 and a top panel 90. FIG. 1 shows the top panel 90 in an inverted position. The locking bar 50 cooperates with a spring 100 to secure the side and top panels 80, 90 to the base 10.

Figure 2:
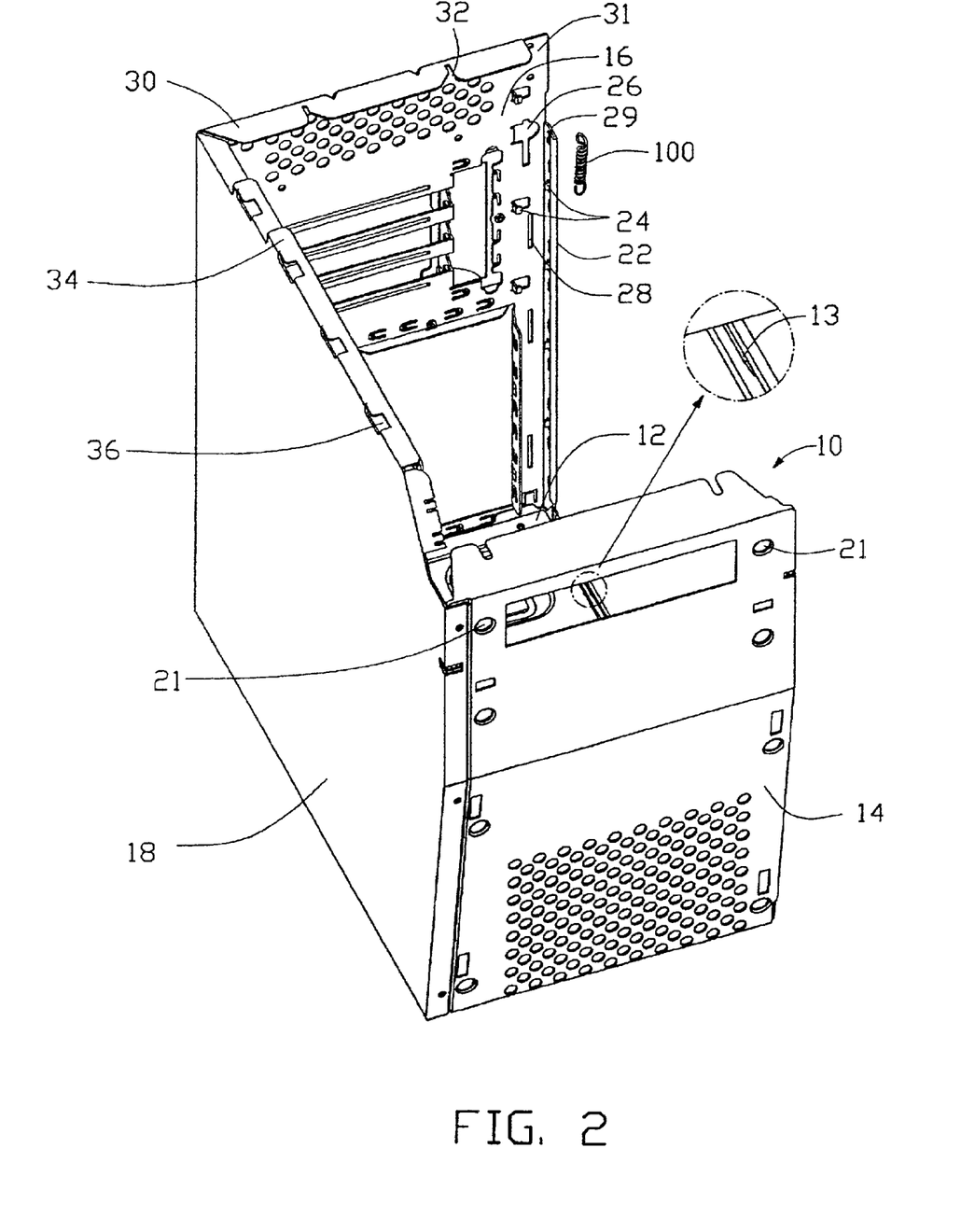
FIG. 2 is a perspective view of a base of the computer enclosure of FIG. 1.

Referring to FIG. 2, the base 10 of the enclosure comprises a bottom plate 12, a front plate 14, a rear plate 16 and a side plate 18. A plurality of locking grooves 13 is defined in a side edge of the bottom plate 12 that is opposite to the side plate 18. A bent flange 22 extends perpendicularly inwardly from an edge of the rear plate 16 that is opposite to the side plate 18. A retaining tab 29 is inwardly formed on an upper portion of the bent flange 22. A plurality of fixing tabs 24 is inwardly formed on the rear plate 16 near the said edge thereof, and also on the bent flange 22. The fixing tabs 24 of the rear plate 16 are bent toward the fixing tabs 24 of the bent flange 22, and all the fixing tabs 24 thereby cooperatively define a receiving space (not labeled) therebetween. An opening 26 is defined in an upper portion of the rear plate 16 between two uppermost fixing tabs 24 of the rear plate 16. A locking tab 27 (see FIG. 6) is rearwardly bent from the rear plate 16 at one side extremity of the opening 26. A first locking hole 25 (see FIG. 6) is defined in the locking tab 27. A plurality of first locking slots 28 is defined in the rear plate 16, in vertical alignment below the opening 26. A first horizontal flange 30 extends inwardly from a top edge of the rear plate 16. An exposed portion 31 of the rear plate 16 is located above the receiving space defined by the fixing tabs 24. A pair of spaced cutouts 32 is defined in a free edge of the first horizontal flange 30. A second horizontal flange 34 extends inwardly from a top edge of the side plate 18. A plurality of first apertures 36 is defined in a junction of the second horizontal flange 34 and the side plate 18. The first apertures 36 are L-shaped. A pair of locating holes 21 is defined near opposite sides of a top portion of the front plate 14 respectively.

The disk drive bracket 20 comprises a sidewall 38. A plurality of locking grooves 44 is defined in a bottom portion of the sidewall 38. The locking grooves 44 of the disk drive bracket 20 are similar to the locking grooves 13 of the bottom plate 12 of the base 10. A bent portion 40 extends horizontally inwardly from a top edge of the sidewall 38. A plurality of second apertures 42 is defined in a junction of the bent portion 40 and the sidewall 38. The second apertures 42 are also L-shaped.

Figure 3:
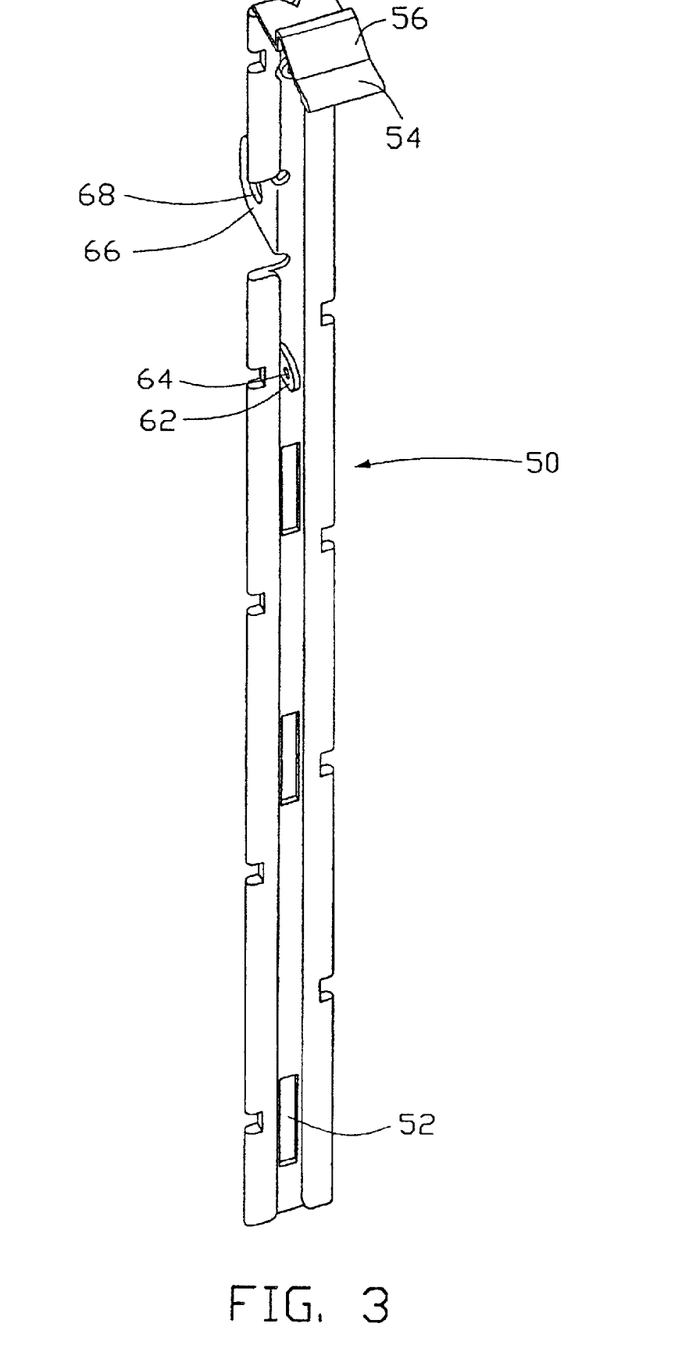
FIG. 3 is a perspective view of a locking bar of the computer enclosure of FIG. 1.

Referring to FIG. 3, the locking bar 50 is elongated. A plurality of second locking slots 52 is defined in the locking bar 50, corresponding to the first locking slots 28 of the rear panel 16 of the base 10. A top end of the locking bar 50 is bent generally perpendicularly to form an arm portion 54. The arm portion 54 has a central blocking section 56 projecting upwardly from a middle thereof. The blocking section 56 has a vertical side face proximate to where the locking bar 50 is bent generally perpendicularly. Another face of the blocking section 56 slopes down from a top of the vertical side face toward a free end of the arm portion 54. A connecting tab 62 is formed on an upper portion of the locking bar 50, and extends in a direction parallel to a direction in which the arm portion 54 is bent from the locking bar 50. A through hole 64 is defined in the connecting tab 62. An operating tab 66 extends from the locking bar 50 between the arm portion 54 and the connecting tab 62, in a direction opposite to the direction in which the arm portion 54 is bent from the locking bar 50. A second locking hole 68 is defined in the operating tab 66. Referring also to FIG. 1, an operating block 70 engages with the operating tab 66 for facilitating operation of the locking bar 50. A third locking hole 72 is defined in the operating block 70, corresponding to the first locking hole 25 of the locking tab 27 and the second locking hole 68 of the operating tab 66.

The side panel 80 of the computer enclosure forms a plurality of hooks 82 at top and bottom peripheral flanges thereof, and a plurality of bent tabs 83 bent inwardly from a rear peripheral flange thereof. The bent tabs 83 correspond to the first locking slots 28 of the rear plate 16 of the base 10. The hooks 82 of the top peripheral flanges correspond to the locking grooves 44 of the sidewall 38 of the disk drive backet 20. The hooks 82 of the bottom peripheral flanges correspond to the locking grooves 13 of the bottom plate 12 of the base 10.

The top panel 90 of the computer enclosure forms a pair of rims 92 extending perpendicularly from opposite sides thereof respectively. A plurality of clasps 94 is inwardly formed from the rims 92. The clasps 94 correspond respectively to the first apertures 36 of the side plate 18 of the base 10, and to the second apertures 42 of the disk drive bracket 20. A pair of posts 91 extends inwardly from a front portion of the top panel 90, for insertion into the locating holes 21 of the front plate 14 of the base 10. A pair of latches 96 is inwardly formed at a rear end of the top panel 90, corresponding to the cutouts 32 of the rear plate 16. A catch 98 is inwardly formed at a rear corner of the top panel 90, corresponding to the exposed portion 31 of the rear plate 16.

Referring to FIGS. 1–6, in assembly, the locking bar 50 is inserted into the receiving space (not labeled). One end of the spring 100 is clasped to the retaining tab 29 of the rear plate 16 of the base 10. The other end of the spring 100 is clasped into the through hole 64 of the connecting tab 62 of the locking bar 50. The locking bar 50 is thereby connected to the base 10. The operating tab 66 of the locking bar 50 extends through the opening 26 of the rear plate 16. The operating block 70 is then attached to the operating tab 66, with the second and third locking holes 68, 72 being aligned with each other. The locking bar 50 can vertically move in the receiving space, with the operating tab 66 moving within the opening 26. When the spring 100 is in a normal state, the second locking slots 52 of the locking bar 50 are substantially higher than the corresponding first locking slots 28 of the rear plate 16. The disk drive bracket 20 is then placed into the base 10, such that it spans between the front and rear plates 14, 16 of the base 10. The sidewall 38 of the disk drive bracket 20 is parallel to but opposite from the side plate 18 of the base 10.

Figure 4:
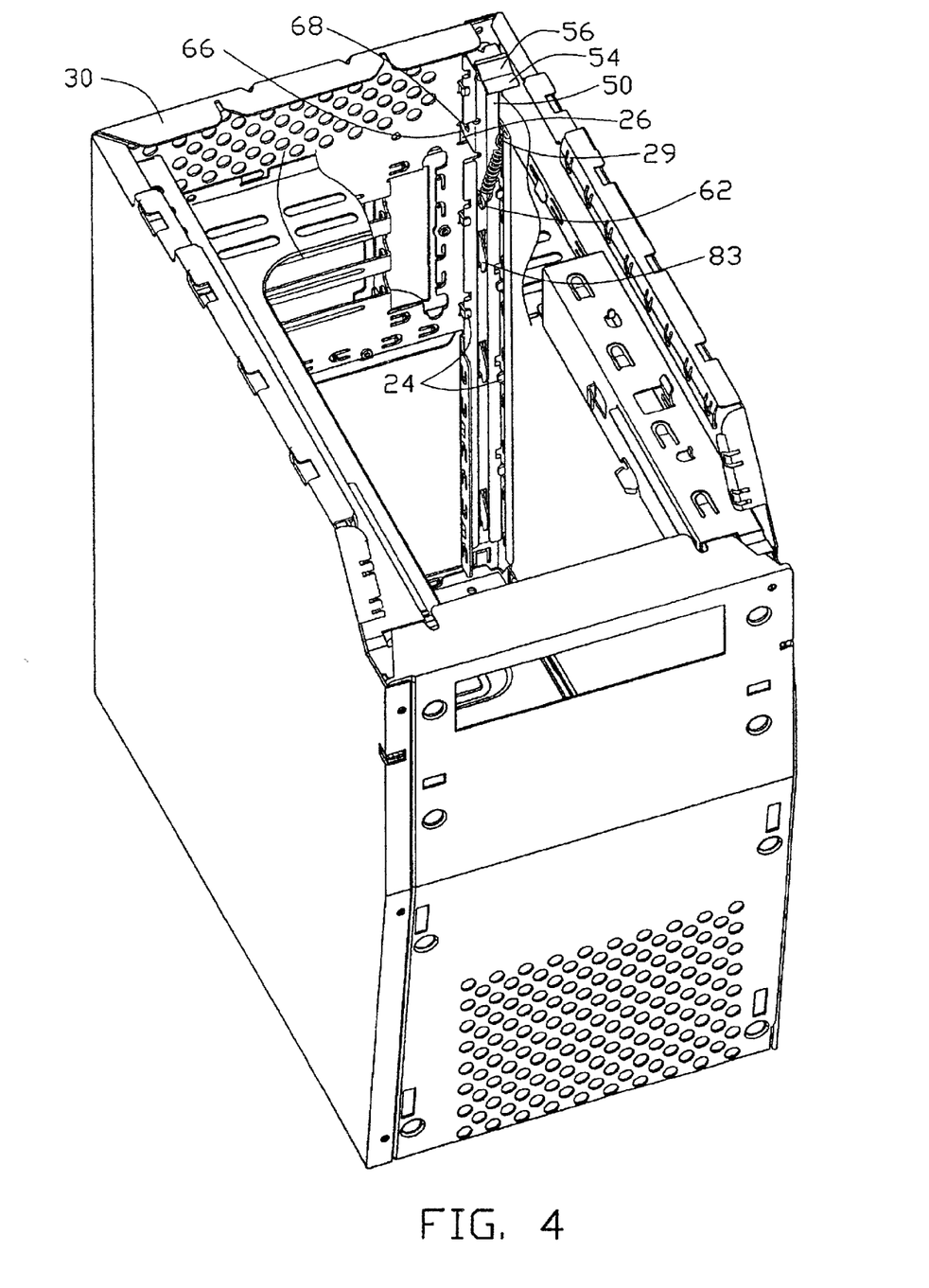
FIG. 4 is a perspective view of the base, the locking bar, a disk drive bracket and a side panel of the computer enclosure of FIG. 1 assembled together, with part of the disk drive bracket cut away for clarity.

In attachment of the side panel 80 to the base 10, the hooks 82 of the side panel 80 are respectively loosely received in the locking grooves 13 of the bottom plate 12 of the base 10, and in the locking grooves 44 of the sidewall 38 of the disk drive bracket 20. At that time, the bent tabs 83 of the side panel 80 are aligned with the first locking slots 28 of the rear plate 16. The side panel 80 is manually pushed forwardly. The hooks 82 are pressingly received in the locking grooves 13 of the base 10 and in the locking grooves 44 of the disk drive bracket 20. The bent tabs 83 of the side panel 80 pass through the first locking slots 28 and force the second locking slots 52 downward. This causes the locking bar 50 to move downwardly, and the spring 100 to stretch. The bent tabs 83 of the side panel 80 are therefore extended through the second locking slots 52. The spring 100 returns to its original position, pulling the locking bar 50 back up to its original position. The bent tabs 83 are prevented from exiting the first and second locking slots 28, 52. Thus, the side panel 80 is secured to the base 10.

Figure 5:
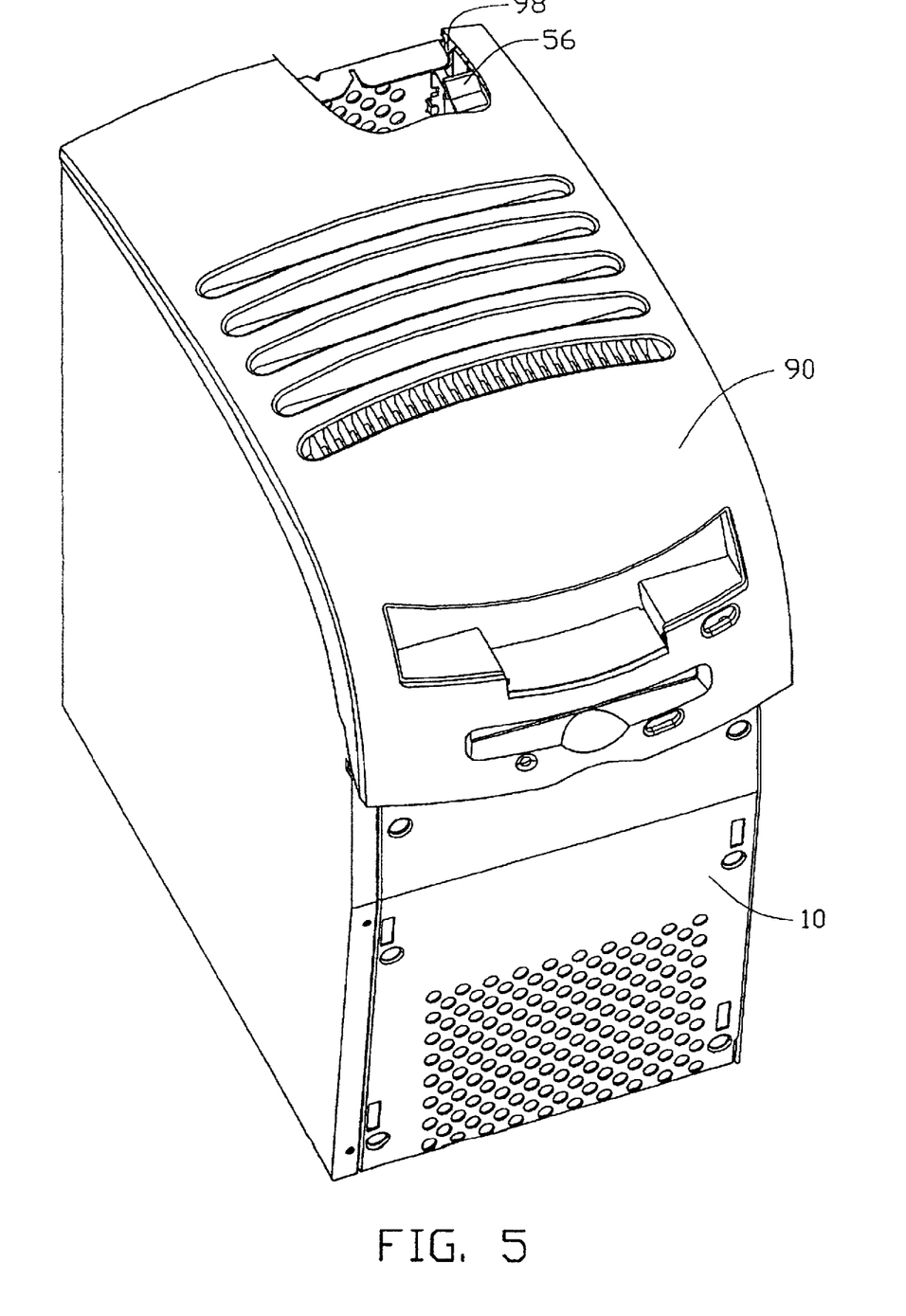
FIG. 5 is an assembled view of FIG. 1, with part of a top panel of the computer enclosure cut away for clarity.

To attach the top panel 90 to the base 10, the posts 91 of the top panel are aligned with the locating holes 21 of the front plate 14. The clasps 94 of the top panel 90 are loosely received in front portions of the first apertures 36 of the side plate 18 and second apertures 42 of the disk drive bracket 20. The top panel 90 is manually pushed rearwardly, to cause the latches 96 of the top panel 90 to lockingly engage in the cutouts 32 of the rear plate 16. The posts 91 of the top panel 90 are inserted into the locating holes 21 of the front plate 14. The clasps 94 of the top panel 90 are interferentially received in rear portions of the first and second apertures 36, 42. The blocking section 56 of the locking bar 50 is depressed by the catch 98 of the top panel 90. The locking bar 50 is thus moved downwardly, and the spring 100 is stretched. The catch 98 passes over the sloped face of the blocking section 56 and beyond the vertical face of the blocking section 56. The spring 100 then returns to its original position, pulling the locking bar 50 back up to its original position. The catch 98 is thus blocked from moving forwardly by the vertical face of the blocking section 56. Thus, the top panel 90 is secured to the base 10.

In the above description, the side panel 80 is secured to the base 10 prior to the top panel 90 being secured to the base 10. It will be readily appreciated that the side panel 80 and the top panel 90 can be independently secured to the base 10. Accordingly, the top panel 90 can be secured to the base 10 prior to the side panel 80 being secured to the base 10.

In detachment of the side panel 80, the operating block 70 is pushed downwardly. The side panel 80 is pushed rearwardly, so that the bent tabs 83 of the side panel 80 exit the first and second locking slots 28, 52. The side panel 80 is then easily removed from the base 10.

In detachment of the top panel 90, the operating block 70 is pushed downwardly. The top panel 90 is pushed forwardly, and the catch 98 is freed from the blocking section 56 of the locking bar 50. The top panel 90 is then easily removed from the base 10.

Figure 6:
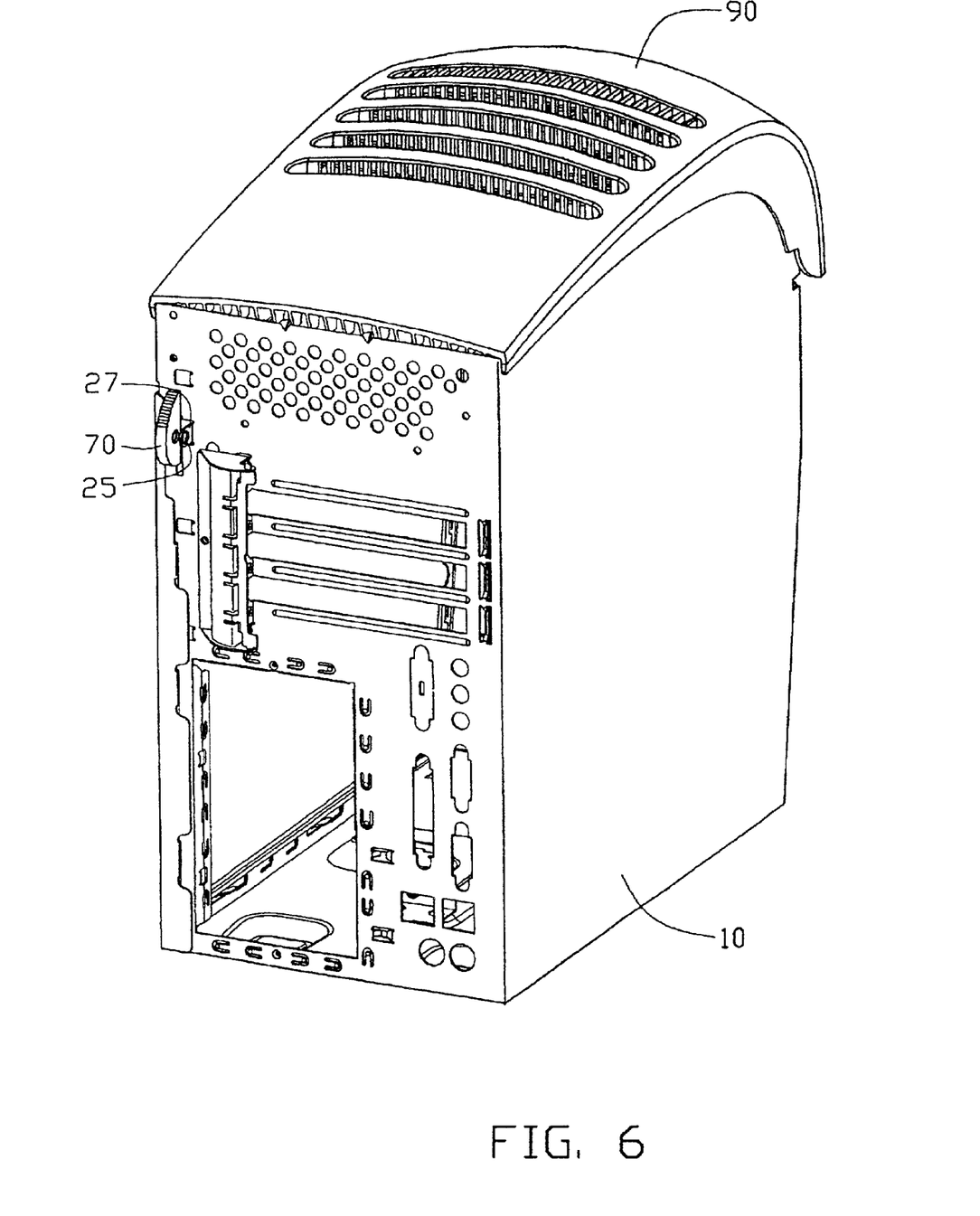
FIG. 6 is an assembled view of FIG. 1, but viewed from a rear of the computer enclosure.

FIG. 6 shows the side and top panels 80, 90 are secured to the base 10. The second and third locking holes 68, 72 respectively of the operating tab 66 and operating block 70 are aligned with the first locking hole 25 of the locking tab 27. The operating tab 66 and the operating block 70 can then be locked to the locking tab 27 by using a conventional locking device such as a padlock. The operating block 70 is thereby fixed to the rear plate 16 of the base 10, and cannot be moved. This protects the enclosure from being opened by unauthorized persons.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
    a base comprising opposite front and rear plates, the rear plate forming a bent flange at a side thereof, a plurality of fixing tabs being formed on the bent flange and on the rear plate near the bent flange, the fixing tabs cooperatively defining a receiving space therebetween, an opening and a plurality of first locking slots being defined in the rear plate at the receiving space;
    a locking bar vertically movably received in the receiving space, a plurality of second locking slots being defined in the locking bar corresponding to the first locking slots of the rear plate, an arm portion at a top of the locking bar, a blocking section being arranged on the arm portion, an operating tab extending from the locking bar and being received in the opening of the rear plate;
    a side panel bridging side edges of the front and rear plates, the side panel comprising a plurality of bent tabs received in the first and second locking slots; and
    a top panel bridging top edges of said front, rear plates and side panel, said top panel detachably attached to at least one of the front, rear plates and side panel, the top panel comprising a catch engaging the arm portion between the rear plate and the blocking section of said arm portion of the locking bar, thereby retaining the attachment of the top panel to the at least one of the front, rear plates and side panel until released by vertically moving the locking bar and arm portion away from the top panel to release the catch.

2. The computer enclosure as claimed in claim 1, wherein the locking bar is connected to the base by an elastic member.

3. The computer enclosure as claimed in claim 2, wherein the elastic member is a spring.

4. The computer enclosure as claimed in claim 2, wherein a retaining tab is formed on the bent flange above the fixing tabs of the bent flange, a connecting tab is formed on the locking bar, one end of the elastic member is clasped to the retaining tab, and an opposite end of the elastic member is engaged with the connecting tab.

5. The computer enclosure as claimed in claim 1, wherein a pair of latches is formed at a rear portion of the top panel, and wherein a pair of cutouts is defined in an upper portion of the rear plate, the cutouts receiving the latches.

6. The computer enclosure as claimed in claim 1, wherein the base further comprises bottom and side plates cooperating with the front and rear plates, and the side and top panels to define a space therebetween, and a disk drive bracket is received in said space of the base with a sidewall spanning between the front and rear plates.

7. The computer enclosure as claimed in claim 6, wherein the side panel is opposite and parallel to the side plate of the base.

8. The computer enclosure as claimed in claim 7, wherein the side panel forms a plurality of hooks at top and bottom peripheral flanges thereof, the hooks engaging with the bottom plate of the base and the sidewall of the disk drive bracket.

9. The computer enclosure as claimed in claim 6, wherein a pair of locating holes is defined in the front plate, and the top panel comprises a pair of posts at a front portion thereof, the posts being received in the locating holes respectively.

10. The computer enclosure as claimed in claim 6, wherein a plurality of apertures is defined in both upper portions of the side plate of the base and the sidewall of the disk drive bracket, and a plurality of clasps is formed at opposite sides of the top panel, the clasps releasably engaging in the apertures.

11. The computer enclosure as claimed in claim 10, wherein each of the apertures is generally L-shaped and has a front portion and a rear portion, and each of the clasps enters into the front portion and engages in the rear portion of a corresponding aperture.

12. The computer enclosure as claimed in claim 1, further comprising an operating block secured to the operating tab of the locking bar.

13. The computer enclosure as claimed in claim 12, wherein a locking tab is bent from the rear plate at one side extremity of the opening of the rear plate.

14. The computer enclosure as claimed in claim 13, wherein the locking tab defines a first locking hole, the operating tab defines a second locking hole, and the operating blocking defines a third locking hole aligned with the first and second locking holes, for allowing the operating tab and the operating block to be locked to the locking tab.

15. The computer enclosure as claimed in claim 10, wherein a pair of flanges extends inwardly from upper edges of the side plate of the base and the sidewall of the disk drive bracket, and the apertures are defined in a junction of the flange of the side plate and the side plate itself, and a junction of the flange of the sidewall and the sidewall itself.

16. A computer enclosure comprising:
    a base comprising a bottom plate, a side plate, and opposite front and rear plates extending perpendicularly from three contiguous sides of the bottom plate;
    a side panel releasably attached to the base with a plurality of engaging devices releasably engaging with side edges of the front, rear and bottom plates;
    a top panel releasably attached to the base with a plurality of latch devices engaging with top edges of the front, rear and side plates; and
    a locking mechanism attached to the base, the locking mechanism being movable between a locked position in which the side and top panels are retained to the base by the locking mechanism, and an unlocked position in which the side and top panels are capable of being independently released from the base.

17. The computer enclosure as claimed in claim 16, wherein the rear plate comprises a plurality of fixing tabs extending therefrom and cooperatively defining a receiving space therebetween, and the locking mechanism comprises a locking bar movably received in the receiving space.

18. The computer enclosure as claimed in claim 17, wherein the rear plate defines a plurality of first locking slots, the engaging devices comprise a plurality of bent tabs extending from a side of the side panel, and the locking bar defining a plurality of second locking slots corresponding to the first locking slots whereby when the locking bar is moved to the unlocked position, the bent tabs are allowed to extend through both the first and second locking slots and when the locking bar is moved to the locked position, the bent tabs engages with the second locking slots thereby securing the side panel in position.

19. The computer enclosure as claimed in claim 17, wherein the locking bar comprises a blocking portion spaced to the rear plate, and the latch devices of the top panel comprises a catch snappingly sandwiched between the rear plate and the blocking portion of the locking bar when the locking bar is located in the locked position.

20. A computer enclosure comprising:
- a unitary base including a bottom plate with a rear plate extending upwardly therefrom, said base having a base lengthwise axis defined as perpendicular to said rear plate;
- a vertical side panel releasably attached to the base along said lengthwise axis;
- a generally horizontal top panel releasably attached to the base along said lengthwise axis; and
- a locking mechanism attached to the base and vertically extending substantially along a corner formed by said rear plate and said side panel, the locking mechanism being movable along a vertical direction perpendicular to said lengthwise axis, and between a locked position in which both the side and top panels are retained to the base by the locking mechanism and can not be moved along the lengthwise axis, and an unlocked position in which the side and top panels are capable of being independently released from the base along said lengthwise axis.

* * * * *